(12) United States Patent
Dhaussy et al.

(10) Patent No.: US 11,454,197 B2
(45) Date of Patent: Sep. 27, 2022

(54) SYSTEM FOR INJECTING AN AQUEOUS SOLUTION INTO AN INJECTION ENGINE

(71) Applicant: Plastic Omnium Advanced Innovation and Research, Brussels (BE)

(72) Inventors: Franck Dhaussy, Margny-les-Compiegne (FR); Stephane Leonard, Brussels (BE); Laurent Duez, Uccle (BE); Pierre Oszwald, Berneuil sur Aisne (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 159 days.

(21) Appl. No.: 16/965,196

(22) PCT Filed: Jan. 29, 2019

(86) PCT No.: PCT/EP2019/052115
§ 371 (c)(1),
(2) Date: Jul. 27, 2020

(87) PCT Pub. No.: WO2019/145561
PCT Pub. Date: Aug. 1, 2019

(65) Prior Publication Data
US 2020/0370515 A1    Nov. 26, 2020

(30) Foreign Application Priority Data

Jan. 29, 2018 (FR) ...................... 18 50681

(51) Int. Cl.
*F02M 25/022* (2006.01)
*C02F 1/42* (2006.01)
(Continued)

(52) U.S. Cl.
CPC ........... *F02M 25/0224* (2013.01); *C02F 1/42* (2013.01); *F02M 25/022* (2013.01);
(Continued)

(58) Field of Classification Search
CPC ............. F02M 25/022; F02M 25/0224; F02M 25/028; C02F 1/42
See application file for complete search history.

(56) References Cited

U.S. PATENT DOCUMENTS

2004/0031752 A1   2/2004 Williams
2006/0266307 A1* 11/2006 Mezheritsky ...... F02M 25/0224
                                                     123/25 J
(Continued)

FOREIGN PATENT DOCUMENTS

WO    WO 2006/092887 A1    9/2006
WO    WO 2016/177556 A1    11/2016
(Continued)

OTHER PUBLICATIONS

International Search Report dated Mar. 19, 2019 in PCT/EP2019/052115 filed on Jan. 29, 2019, 3 pages.

*Primary Examiner* — Kevin A Lathers
(74) *Attorney, Agent, or Firm* — Oblon, McClelland, Maier & Neustadt, L.L.P.

(57) ABSTRACT

A system for injecting an aqueous solution into an injection engine, includes: a tank for an aqueous solution, a circuit for supplying aqueous solution to the tank and a filter for filtering the aqueous solution, and a circuit for recirculating the aqueous solution. The injection system also includes recirculation of the aqueous solution, and is provided with an electrovalve including a first inlet connected to a filler neck of the tank, a second inlet connected to the recirculation circuit, and an outlet connected to the supply circuit. The filtration filter is arranged in the supply circuit and/or in the recirculation circuit.

16 Claims, 4 Drawing Sheets

(51) Int. Cl.
*F02M 25/028* (2006.01)
*C02F 103/02* (2006.01)
(52) U.S. Cl.
CPC ..... *F02M 25/028* (2013.01); *C02F 2103/023* (2013.01); *C02F 2201/001* (2013.01); *C02F 2201/005* (2013.01); *C02F 2201/006* (2013.01); *C02F 2209/001* (2013.01); *C02F 2301/046* (2013.01); *C02F 2303/22* (2013.01)

(56) References Cited

U.S. PATENT DOCUMENTS

| | | |
|---|---|---|
| 2010/0096406 A1 | 4/2010 | Williams |
| 2016/0016836 A1 | 1/2016 | Sudnick et al. |
| 2018/0128212 A1 | 5/2018 | Burak et al. |
| 2019/0040819 A1 | 2/2019 | Heidemeyer et al. |

FOREIGN PATENT DOCUMENTS

| | | |
|---|---|---|
| WO | WO 2016/177561 A1 | 11/2016 |
| WO | WO 2017/137100 A1 | 8/2017 |

* cited by examiner

SYSTEM FOR INJECTING AN AQUEOUS SOLUTION INTO AN INJECTION ENGINE

This invention relates generally to the technical field of tanks for storing a liquid, configured to deliver a liquid to a combustion engine. The invention more particularly relates to a system for injecting a liquid, in particular an aqueous solution, into an injection engine of a vehicle, in particular a motor vehicle.

The invention also relates to a process for injecting an aqueous solution into an injection engine.

The invention also relates to a process for purifying an aqueous solution for a system for injecting an aqueous solution into an injection engine.

The invention finally relates to a process for diagnosing the purity of an aqueous solution for a system for injecting an aqueous solution into an injection engine.

It is known to inject water into the engine's air intake circuit. This water is mixed with intake gas and makes it possible to reduce the combustion temperatures and the emission of pollutants referred to as NOx, and to increase the performance, for example, of a petrol engine by reducing knock sensitivity. Such an injection system is described in patent document FR2801076A1.

However, to ensure the correct operation of a conventional injection system, it is known to fill the storage tank with demineralized water so as not to clog the injection circuit with scale. This is unsatisfactory. Indeed, filling the tank with demineralized water is restrictive. The user of a motor vehicle fitted with such an injection system must take bottles of demineralized water with them when they go on journeys, since it is necessary to plan for approximately 3 liters of demineralized water per 1,000 kilometers traveled. It is of course possible to buy demineralized water in gas stations, but the user will not find them in every gas station.

One aim of the invention is in particular to overcome the above-mentioned disadvantages. To this end, an object of the invention is a system for injecting an aqueous solution into an injection engine, comprising a tank for an aqueous solution, a circuit for supplying aqueous solution to the tank, a filter for filtering the aqueous solution, and a circuit for recirculating the aqueous solution. According to the invention, the injection system further comprises a circuit for recirculating the aqueous solution, and an electrovalve comprising a first inlet connected to a filler neck of the tank, a second inlet connected to the recirculation circuit, and an outlet connected to the supply circuit, the filtration filter being arranged in said supply circuit and/or in said recirculation circuit.

By virtue of the invention, it is no longer necessary to fill the storage tank with demineralized water. Indeed, the user of the vehicle may fill the storage tank with tap water or rainwater without risking causing scaling of the injection circuit, since this water is filtered by the injection system. Tap water is easy to find: it is available in all gas stations and even elsewhere. By virtue of the invention, the user no longer needs to carry bottles of demineralized water in their vehicle, nor do they need to seek out a gas station which sells demineralized water; it is sufficient to find a mains water faucet and to fill the storage tank with this water, for example using a hose or watering can.

In the various embodiments which will be described below, the water which is poured into the storage tank by the user is conveyed into a recirculation circuit of the injection system; this is a circuit wherein the water will pass through the filtration filter as many times as necessary to be demineralized. The water which passes through the recirculation circuit is referred to as "recirculated water".

In a particular embodiment of the invention, the filtration filter is placed simultaneously in the supply circuit of the tank and in the recirculation circuit of the tank. In this embodiment, the water which is poured into the supply circuit is filtered for a first time before filling the tank. This configuration of the filter is particularly advantageous when the tank is filled with rainwater. Indeed, rainwater often contains more minerals and impurities than tap water.

In a preferred embodiment of the invention, the filtration filter is placed in the sole recirculation circuit of the tank. In this preferred embodiment, the tank is filled more quickly because of the absence of head loss in the supply circuit, by virtue of the absence of filter in the supply circuit.

According to additional features of the invention:
 the system further comprises an injection duct intended to be connected to an intake circuit of the injection engine, the system being configured so that the aqueous solution originating from the filtration filter passes via the tank before penetrating the injection circuit.
 the supply circuit comprises a supply pipe connected to the tank and also a filler neck for the tank, connected to the supply pipe. Thus, the filling point of the tank is not linked to the location at which the tank is found in the vehicle.
 the recirculation circuit comprises a pipe for inlet into the tank and a pipe for outlet out of the tank. In this fashion, the water is recirculated outside the tank, which has the advantage of making the filter more easily accessible when the latter is placed in the recirculation circuit.
 the aqueous solution is water, in particular tap water or rainwater, and the filter is a filter that retains minerals and/or impurities. In this fashion, minerals and/or impurities which could be present in the water of the tank are prevented from entering into the injection circuit of the engine.
 the filter that retains minerals is a demineralization filter comprising a filtering medium consisting of an ion-exchange resin. Thus, even very hard water can be demineralized.
 the filter that retains impurities is a fine filter. This is particularly advantageous when the water of the tank has, aside from minerals, suspended particles liable to clog the injection circuit.
 the filter is a removable interchangeable filter. In this fashion, maintenance of the filter is facilitated.
 the filter comprises a filtering cartridge which is washable, rechargeable or disposable. Thus, the filter can be cleaned, recharged or replaced as desired.
 the filter comprises heating means capable of heating the aqueous solution.
 This is particularly advantageous when the water present in the filter is frozen and it is necessary to defrost it.
 the injection system according to the invention further comprises a sensor for the quality of said aqueous solution. Thus, the lifetime of the filter is increased by reducing the recirculation time of the water as much as possible, that is to the minimum time necessary for the recirculated water to have the desired physicochemical properties. This thereby increases the lifetime of the pump, reduces noise and the electrical power consumed.

The invention also provides a process for purifying an aqueous solution for a system for injecting an aqueous solution into an injection engine, comprising the following steps:

filling a tank with an aqueous solution by a supply circuit,
pumping said aqueous solution contained in said tank,
sending said pumped aqueous solution into a circuit for recirculating said aqueous solution,
filtering said aqueous solution into said supply circuit and/or into said recirculation circuit.

The purification process preferably further comprises the following steps, after the filtration step:
sending said aqueous solution into the tank,
sending said aqueous solution into an injection duct intended to be connected to an intake circuit of the injection engine.

The invention also provides a process for diagnosing an aqueous solution for a system for injecting an aqueous solution into an injection engine, comprising the following steps:
measuring a physicochemical property $\sigma$ of an aqueous solution contained in a tank,
comparing the measured physicochemical property $\sigma_m$ to a range of reference values [$\sigma_{ref.min}$, $\sigma_{ref.max}$] wherein $\sigma_{ref.min}$ is a minimum reference value and $\sigma_{ref.max}$ is a maximum reference value,
sending said aqueous solution into a demineralization filter if the measured physicochemical property $\sigma_m$ is outside said range of reference values [$\sigma_{ref.min}$, $\sigma_{ref.max}$],
repeating the preceding steps as long as the measured physicochemical property $\sigma_m$ is outside said range of reference values [$\sigma_{ref.min}$, $\sigma_{ref.max}$],
announcing with a signal S a problem if after a predetermined period of time T, the measured physicochemical property $\sigma_m$ remains outside said range of reference values [$\sigma_{ref.min}$, $\sigma_{ref.max}$]. A signal S is, typically, a light which is illuminated on the vehicle's dashboard. T is advantageously between 3 minutes and 30 minutes.

Finally, according to the invention a process for injecting an aqueous solution into an injection engine, comprising the following steps is provided:
measuring a physicochemical property $\sigma$ of an aqueous solution contained in a tank,
comparing the measured physicochemical property $\sigma_m$ to a range of reference values [$\sigma_{ref.min}$, $\sigma_{ref.max}$] wherein $\sigma_{ref.min}$ is a minimum reference value and $\sigma_{ref.max}$ is a maximum reference value,
sending said aqueous solution into the injection engine if the measured physicochemical property $\sigma_m$ is within said range of reference values [$\sigma_{ref.min}$, $\sigma_{ref.max}$]

Different embodiments of the invention will now be described by way of nonlimiting examples using the following figures.

Figure 1:
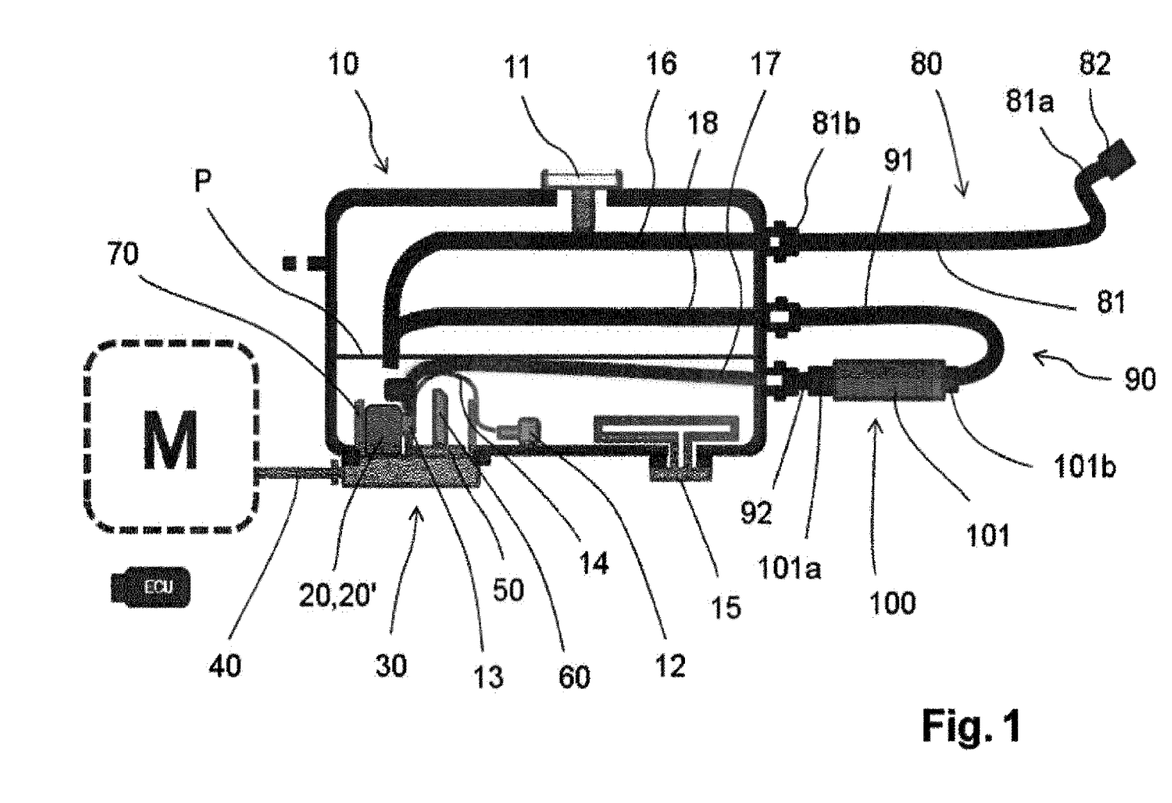
FIG. 1 is a sectional schematic view of a system for injecting an aqueous solution into an injection engine according to an embodiment which is not part of the invention.

A system for injecting an aqueous solution into an intake circuit of an injection engine as illustrated in FIG. 1 comprises a storage tank 10 intended to receive an aqueous solution, which is preferentially water. In the example illustrated, the tank is manufactured from two half-shells obtained by molding a plastic material. The two half-shells are heat-welded to one another along a bond line P to form a closed storage tank. Components are introduced and fixed in the tank before it is closed by heat welding. In operation, the water of the tank (not shown) is pumped by a supply pump 20. The supply pump 20 is an electric pump housed inside the tank 10, in the bottom of same, and forms part of a module 30 for supplying the injection engine with water. A water supply module, also referred to as WDM for "Water Delivery Module", is a set of components arranged to provide pressurized water to an injection engine M. The components of the WDM module include a water pump like the supply pump 20, and an injection duct 40 for injecting pressurized water into the engine M. It is also possible to find a temperature sensor 50 for measuring the temperature of the water, and a quality sensor 60 for measuring one or more physicochemical properties of the water. In addition, the WDM module may accommodate a stabilizing pot 70, also called "swirl pot", intended to permanently store a volume of water useful to the correct operation of the supply pump 20. It is also possible to find a water level sensor (not shown), either inside the swirl pot 70 or outside same.

In operation, the pumped water is sent under pressure by the injection duct 40 into the intake circuit (not shown) of the injection engine M. In a particular embodiment of the invention, the water is injected into the engine at a pressure of 10.5 bar.

It is recalled that the aim of a water injection system is to reduce the temperature of the air-fuel mixture at the inlet of the combustion chamber of the injection engine. By virtue of such a system, better resistance to compression is obtained in petrol engines and better combustion is obtained in diesel engines. The water also has a cooling effect on the internal engine components (pistons and cylinders). This results in reduced pollution (unburnt particles, CO, NOx) and a fuel saving of up to 25% in intensive use.

In systems for injecting water into the engine, the supply pump 20 is controlled by an electronic control unit ECU of the injection engine. The ECU unit acts on actuators such as injectors, air intake valves, pumps, based on information that it receives from sensors, such as for example sensors of the position of the gas pedal, of the engine temperature, of the air temperature, of the oxygen level, etc. When the ECU unit considers that all the conditions required to be able to inject water into the engine M have been met, it orders the activation of the supply pump 20. Nonetheless, in order not to cause scaling of the water injection circuit which contains, in particular, the injection duct 40 and the water injectors (not shown), the water which is injected into the engine M is demineralized water, i.e. water which in principle does not contain any ions such as $Ca^{2+}$ and $HCO_3^-$. In the automotive industry, a water is considered to be demineralized when its electrical conductivity is less than 100 µS/cm at 25° C. Sometimes requirements are stricter and water will be considered to be demineralized if its electrical conductivity is less than 50 µS/cm at 25° C.

Filling the tank with demineralized water is restrictive. Indeed, demineralized water is not naturally available, and the driver of a vehicle fitted with such an injection system must carry bottles of demineralized water with them when they go on journeys, since it is necessary to plan for approximately 3 liters of demineralized water per 1000 kilometers traveled. It is of course possible to buy demineralized water in gas stations, but the driver will not find them in every gas station.

A first aim of this invention is to do away with the restriction of having to use demineralized water in a system for injecting water into a combustion engine. To this end, the invention proposes filtering the water in a demineralization filter before injecting it into the combustion engine. Consequently, and by virtue of the invention, it is possible to use tap water or rainwater to fill the storage tank, without risking causing scaling of the water injection circuit. Thus, the driver no longer needs to be weighed down with bottles of demineralized water before setting off on a journey, nor to buy demineralized water in gas stations when they find some.

In a preferred embodiment of the invention, the water injection system comprises a water storage tank 10, a circuit 80 for supplying the tank 10, a circuit 90 for recirculating water from the tank 10, and a filter 100 for filtering water from the tank 10. The supply circuit 80 consists of a supply pipe 81 and a filler neck 82 via which water is introduced into the water injection system. The supply pipe 81 has two ends, a first end 81a to which the filler neck is connected, and a second end 81b connected by the outside to the tank 10 and opening into the top of the tank. Means (not shown) are provided for ensuring the leak-tightness of the joins. Like the supply circuit 80, the recirculation circuit 90 is connected by the outside to the tank 10.

According to one embodiment which is not part of the invention illustrated in FIG. 1, the recirculation circuit 90 consists of a pipe for inlet 91 into the tank 10 and a pipe for outlet 92 out of the tank, and the pipe for inlet 91 into the tank opens into the top of the tank 10 and the pipe for outlet 92 out of the tank opens into the bottom of the tank 10.

In the context of the present description, the bottom of the tank refers to that part of the tank which is filled first, and the top of the tank refers to that part of the tank which is filled last. Likewise, the inside of the tank is the volume delimited by the walls of the tank wherein the water is stored, and the outside of the tank is the open volume around the tank.

A filter 100 for filtering the water from the tank 10 is placed in the recirculation circuit 90. In one embodiment which is not part of the invention illustrated in FIG. 1, the filter 100 is placed between the pipe for outlet 92 from the tank and the pipe for inlet 91 into the tank.

According to the invention, the filter 100 is a demineralization filter, for example a filter containing a filtering medium consisting of an ion-exchange resin. A recirculation pump 20', controlled by the ECU unit, pumps the water contained in the tank 10 to send it under pressure either into the recirculation circuit 90 when the water is not demineralized or into the engine intake circuit, via the injection pipe 40, when the water is demineralized. Since the water leaving the tank 10 is demineralized, it no longer needs to pass through a demineralization filter before being sent into the engine intake circuit. In this advantageous embodiment, the recirculation pump 20' and the supply pump 20 form only a single pump. In order to determine which circuit to send the water into, the ECU unit relies on the information provided by a quality sensor 60 to inform it of the concentration of ions in the water. A quality sensor is for example a sensor of the electrical conductivity of the water. The quality sensor is placed inside the tank 10, at the bottom of same, preferably inside the swirl pot 70 so that, even if the tank 10 is virtually empty, the quality sensor remains submerged in the water. In the case wherein the quality sensor 60 is a sensor that continuously measures the electrical conductivity of the water contained in the tank 10, the measurements taken are compared to a range of reference electrical conductivity values, for example [0, 100] µS/cm and, preferably, [2, 50] µS/cm, where 0 µS/cm respectively 2 µS/cm, is a minimum reference value and where 100 µS/cm, respectively 50 µS/cm, is a maximum reference value. If the values measured are outside said range of reference values, then the ECU unit orders the pump 20 to send the water into the recirculation circuit 90 in order to demineralize the water. On the other hand, if the values measured are within the range of reference values, then the ECU unit orders the pump 20 to send the water from the tank 10 into the engine's intake circuit, via the injection duct 40, without passing via another demineralization filter. It may be the case that the measured values remain outside the range of reference values, such that the water is no longer injected into the engine. This situation may arise for example when the filter 100 is clogged, damaged, or absent. In this case, the ECU unit announces a problem with the filter by illuminating a warning light on the vehicle's dashboard. In response to this signal, the driver or the technician in charge of the maintenance of the vehicle fitted with this injection system will clean, recharge or replace the filter.

Advantageously, the demineralization filter 100 is a removable interchangeable filter so as to be easy to remove and replace by the driver or the technician in charge of the maintenance of the vehicle. In a preferred embodiment of the invention, the removable interchangeable demineralization filter is a filtering cartridge 110 (see FIG. 4) comprising a filtering medium consisting of an ion-exchange resin. The filtering cartridge is housed in a filter casing 101 comprising an inlet orifice 101a and an outlet orifice 101b for water. The filter casing 101 is mounted in the recirculation circuit 90 between the pipe for outlet 92 out of the tank and the pipe for inlet 91 into the tank, such that the water which leaves the tank 10 via the outlet pipe 92 enters into the filter casing 101 via the inlet orifice 101a thereof, then passes through the filtering cartridge 110 before leaving the filter casing 101 via the outlet orifice 101b thereof, then returns into the tank 10 via the inlet pipe 91. To facilitate maintenance of the filtering cartridge 110, the filter casing 101 is positioned in an easily accessible region of the vehicle, for example under the engine hood.

Aside from the above-mentioned features and components, a ventilation device 11 is fitted in the top of the tank 10 to balance out the pressure between the inside and the outside of the tank 10. A jet pump 12 associated with a check valve 13 and a suction hose 14 serves to fill the swirl pot 70 in order to ensure correct operation of the WDM module. A heating means 15 is also provided inside the tank 10 to defrost the water in the tank when it freezes. The heating means 15 is typically an electric resistive heater fixed to the bottom of the tank 10. When the tank 10 is filled via the filler neck 82, it is advantageous for the swirl pot 70 to be filled first; for this purpose, an internal hose 16 is added during the manufacture of the storage tank 10. The hose 16 is located inside the tank and extends between two ends: one end connected in a leak-tight manner to the supply pipe 81 via the inside of the tank 10, and a free end opening out above the swirl pot 70 and oriented in the direction of the latter. Thus, when water is poured into the filler neck 82 of the tank, this water flows into the supply pipe 81 then into the hose 16 before opening into the swirl pot 70.

In one embodiment which is not part of the invention and is illustrated in FIG. 1, during the manufacture of the tank 10, a second internal hose 17 is placed in the tank. The hose 17 is a hose which extends between the supply pump 20 and the pipe for outlet 92 out of the tank 10, to connect said pump to the recirculation circuit 90. Thus, when the ECU unit orders the supply pump 20 to send the water from the tank 10 into the recirculation circuit 90, this water is sent under pressure into the recirculation circuit 90 through the hose 17. Sending the water under pressure into the recirculation circuit 90, that is into the filter 100, is particularly advantageous since this thereby avoids a head loss in the recirculation circuit 90 caused by the passage of the water into the filter 100.

During the manufacture of the tank 10, a third internal hose 18 is placed in the tank. Like hose 16, hose 18 is used to fill the swirl pot 70. Hose 18 extends between two ends: one end connected in a leak-tight manner to the pipe for inlet 91 into the tank, and a free end opening out above the swirl pot 70 and oriented in the direction of the latter.

Figure 2:
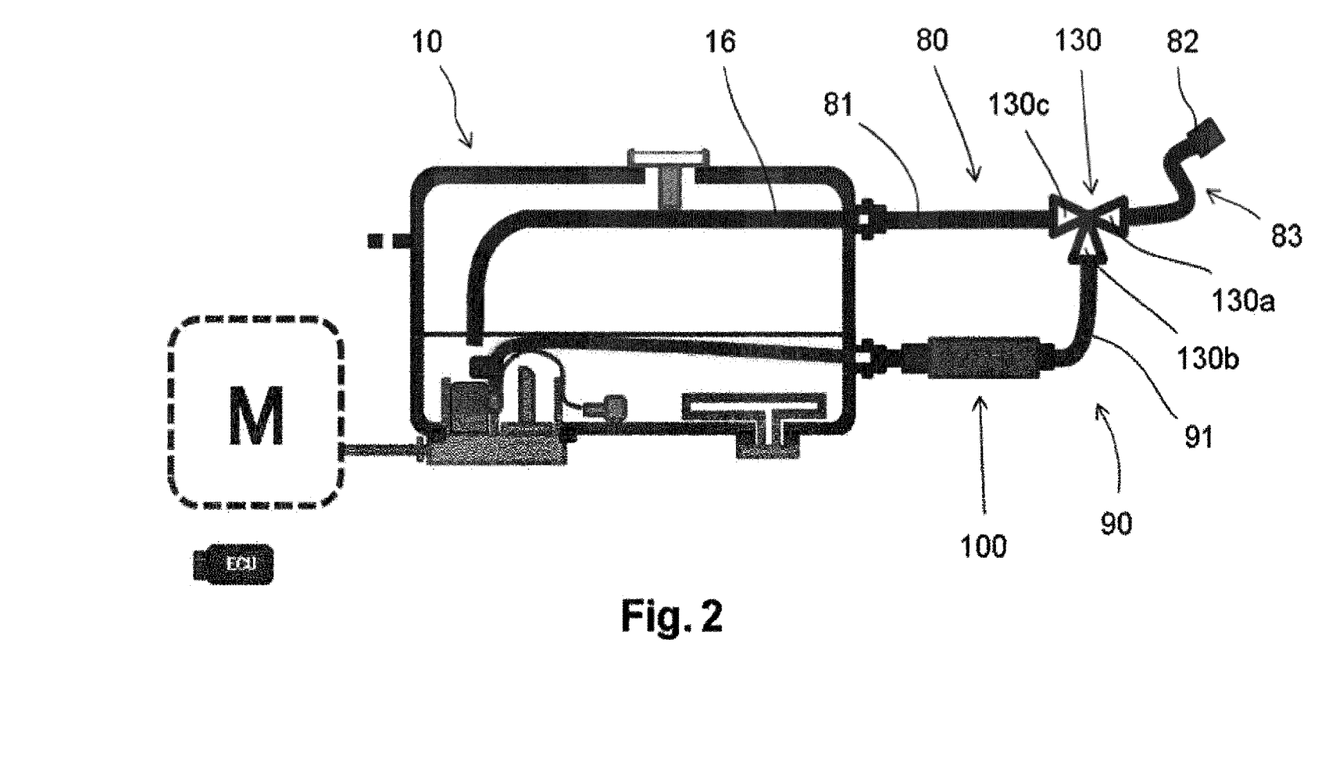
FIG. 2 is a sectional schematic view of a system for injecting an aqueous solution into an injection engine according to a first embodiment of the invention.

According to a first embodiment of the invention shown in FIG. 2, the injection system comprises an electrovalve 130 driven by the ECU unit. The electrovalve 130 is a 3-way electrovalve comprising a first inlet 130a connected to the filler neck 82, a second inlet 130b connected to the inlet pipe 91 of the recirculation circuit 90, and an outlet 130c connected to the supply pipe 81 of the supply circuit 80. Thus, when the tank 10 is filler via the filler neck 82, the ECU unit orders the electrovalve 130 to open the filling circuit 83 and also the supply circuit 80, and to close the recirculation circuit 90. The filling circuit 83 is the section of the supply circuit 80 located upstream of the electrovalve 130. As soon as the tank 10 is filled, the ECU unit orders the electrovalve 130 to close the filling circuit 83 and to open the recirculation circuit 90. Thus, the water from the tank is recirculated in the recirculation circuit 90 so as to be filtered by the filter 100 placed in the recirculation circuit 90.

By virtue of this particular configuration of the injection system according to the invention, the water recirculated in the recirculation circuit 90 returns to the tank 10 via the internal hose 16; this thereby limits the number of hoses present in the tank 10 by doing away with the internal hose 18.

Figure 3:
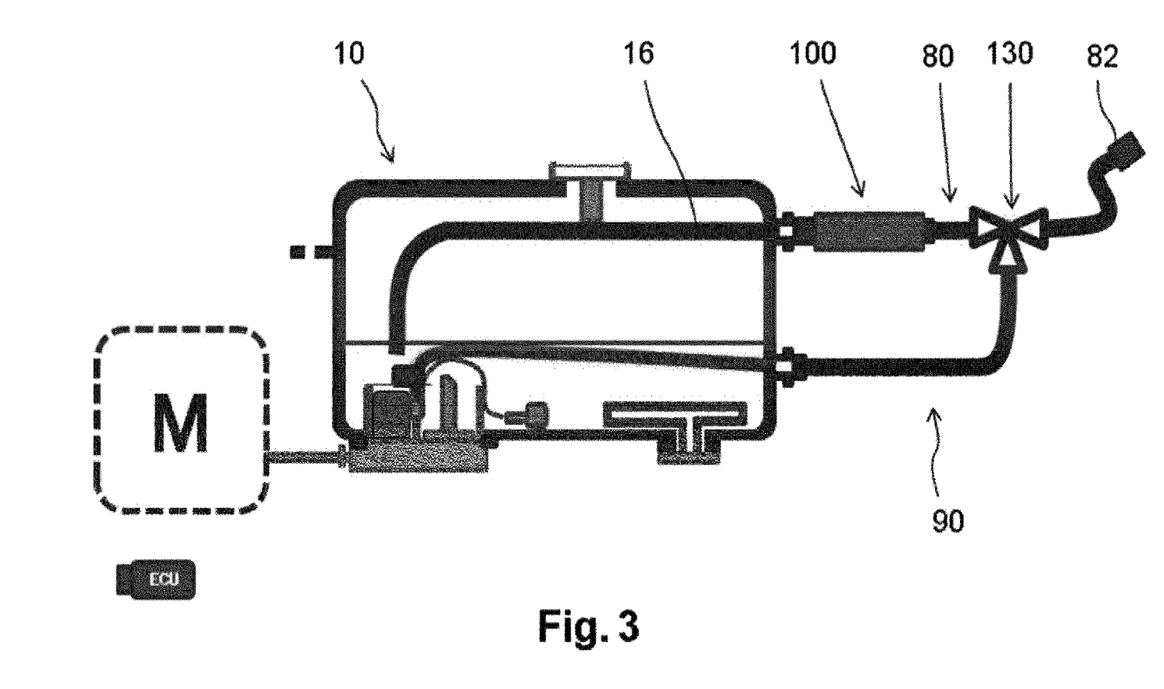
FIG. 3 is a sectional schematic view of a system for injecting an aqueous solution into an injection engine according to a second embodiment of the invention.

FIG. 3 illustrates a variant embodiment of the first embodiment of the invention. In this second embodiment, the filtration filter 100 is placed in the supply circuit 80. By virtue of this particular injection system, the water which is poured into the filler neck 82 is filtered for a first time before filling the tank 10.

Figure 4:
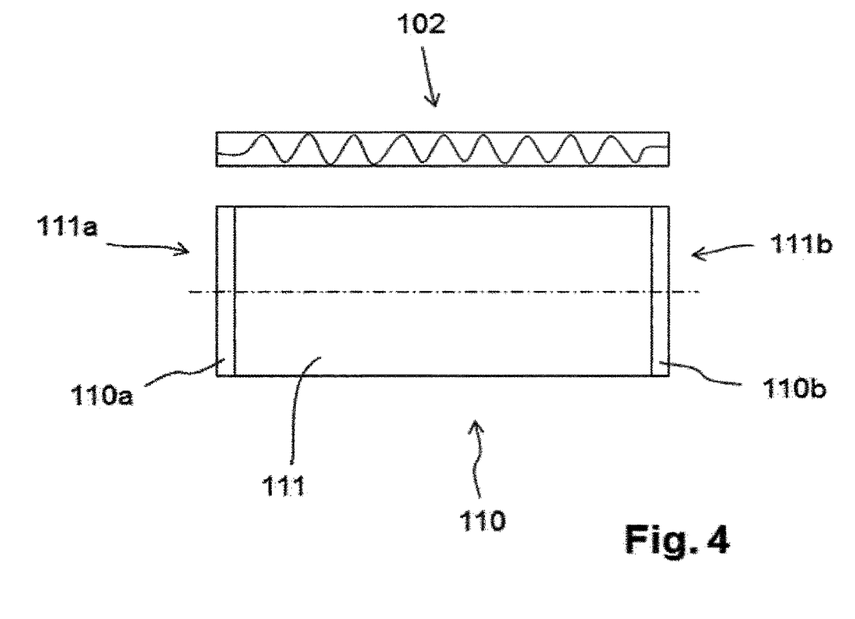
FIG. 4 is a schematic view of a filtering cartridge according to the invention.

FIG. 4 is a schematic depiction of the filtering cartridge 110 for demineralization. The filtering cartridge 110 typically consists of a hollow body 111 filled with a filtering medium such as, for example, an ion-exchange resin. The filtering cartridge has an inlet 111a for the water to be filtered and an outlet 111b for the filtered water. The inlet 111a of the filtering cartridge communicates with the inlet orifice 101a of the filter casing 101 and the outlet 111b of the filtering cartridge communicates with the outlet orifice 101b of the filter casing 101. Sealing means 110a and 110b are associated with the filtering cartridge to ensure that all the water that leaves the filter casing 101 has passed through the filtering cartridge 110. Moreover, means for heating 102 the filter 100 are provided, in order to defrost the water which could have become frozen in the filter, due to weather conditions for example. These heating means 102 are typically an electric resistive heater housed inside the filter casing 101 or alternatively outside same.

Figure 5:
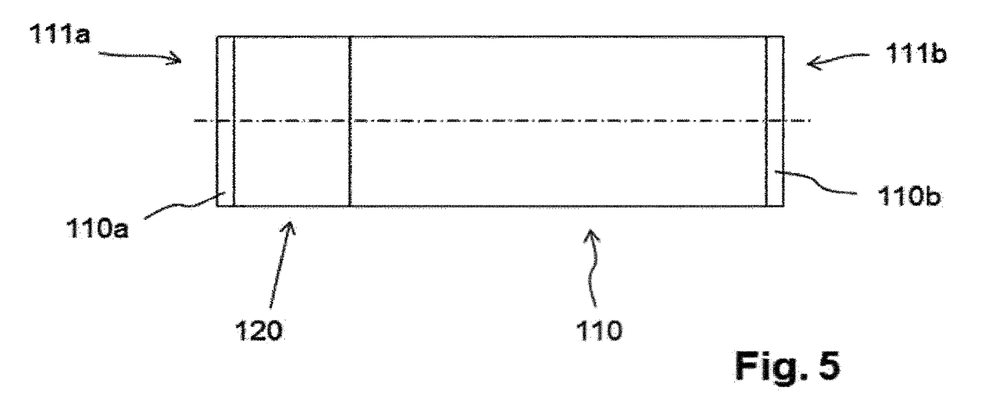
FIG. 5 is a schematic view of another filtering cartridge according to the invention.

FIG. 5 shows a variant embodiment of the filtering cartridge, wherein a fine filter 120 is associated with the demineralization filter 110. A fine filter is a porous body (felt, paper, membrane, mesh, etc.) through which a liquid is passed in order to clarify or purify it. In the invention, the fine filter serves to filter the impurities present in the water, such as, for example, suspended particles or organic debris. In a preferred embodiment, the fine filter has a mesh width of between 30 µm and 60 µm.

Of course, numerous modifications may be made to the invention without departing from the scope thereof.

For example, instead of being connected by inlet and outlet pipes outside the tank 10, the recirculation circuit 90 may be connected by inlet and outlet pipes inside the tank 10. By virtue of this configuration, it is possible to envision placing the filtration filter 100 in a housing made in the wall of the tank 10 (not shown). Such a housing will be hermetically sealed by a screw cap so as to be able to be unscrewed in order to make the filter removable and interchangeable. In this configuration, the number of hoses and pipes outside the tank is reduced and, in addition, the heating of the filter is facilitated.

Moreover, in order for the water injection system according to the invention to have a lower weight and to be impact resistant, the tank may be manufactured in plastic, for example in high-density polyethylene (HDPE). Advantageously, the pipes and hoses may also be manufactured in plastic, as may the filter casing.

In addition, it is possible to determine the concentration of ions of the water contained in the tank and therefore its demineralized or not demineralized nature, by measuring something other than the electrical conductivity of the water. For example, measuring the electrical resistivity of the water, the hardness thereof, the density thereof, the turbidity thereof or the pH thereof also gives good information regarding the demineralized or not demineralized nature of the water. Thus, the quality sensor described previously may alternatively be an electrical resistivity sensor, a hardness sensor, a density sensor, a water turbidity sensor or a pH probe. Consequently, quality sensor is used to refer to any type of sensor able to measure a physicochemical property of the water, giving information representative of the concentration of ions in the water. Thus, in the case wherein the quality sensor 60 is a sensor which continuously measures the electrical resistivity of the water of the tank 10, the range of reference values will extend from 20 kΩ·cm to infinity and preferably from 40 kΩ·cm to 500 kΩ·cm.

The invention claimed is:

1. A system for injecting an aqueous solution into an injection engine, comprising a tank for an aqueous solution, a circuit for supplying aqueous solution to said tank and a filter for filtering the aqueous solution, a pump for pumping the aqueous solution, and a circuit for recirculating said aqueous solution,
    wherein the system further comprises an electrovalve comprising:
        a first inlet connected to a filler neck of the tank,
        a second inlet connected to the recirculation circuit, and
        an outlet connected to the supply circuit, and
    wherein said filtration filter is placed in said supply circuit and/or in said recirculation circuit.

2. The injection system according to claim 1, further comprising an injection duct intended to be connected to an intake circuit of the injection engine, the system being configured so that the aqueous solution originating from the filtration filter passes via the tank before penetrating the injection circuit.

3. The injection system according to claim 1, wherein said supply circuit comprises a supply pipe connected to said tank as well as a filler neck of said tank connected to said supply pipe.

4. The injection system according to claim 1, wherein said recirculation circuit comprises a pipe for inlet into the tank and a pipe for outlet out of the tank.

5. The injection system according to claim 1, wherein said aqueous solution is water, in particular tap water or rainwater, and said filter is a filter that retains minerals and/or impurities.

6. The injection system according to claim 5, wherein said filter that retains minerals is a demineralization filter comprising a filtering medium consisting of an ion-exchange resin.

7. The injection system according to claim 5, wherein said filter that retains impurities is a fine filter.

8. The injection system according to claim 5, wherein said filter is a removable interchangeable filter.

9. The injection system according to claim 8, wherein said filter comprises a filtering cartridge which is washable, rechargeable or disposable.

10. The injection system according to claim 1, wherein said filter comprises heating means capable of heating said aqueous solution.

11. The injection system according to claim 1, further comprising a quality sensor for said aqueous solution.

12. A process for purifying an aqueous solution for a system for injecting an aqueous solution into the injection system according to claim 1, comprising:
   a. filling the tank with an aqueous solution by the supply circuit,
   b. pumping said aqueous solution contained in said tank,
   c. sending said aqueous solution pumped in step b) into the circuit for recirculating said aqueous solution, and
   d. filtering said aqueous solution into said supply circuit and/or into said recirculation circuit.

13. The process for purifying an aqueous solution according to claim 12, further comprising, after step d)
   e. sending said aqueous solution into the tank, and
   f. sending said aqueous solution into an injection duct intended to be connected to an intake circuit of the injection engine.

14. A process for diagnosing the purity of an aqueous solution for a system for injecting an aqueous solution into an injection engine, comprising:
   a. measuring a physicochemical property a of an aqueous solution contained in a tank,
   b. comparing the physicochemical property $\sigma_m$ measured in step a) to a range of reference values [$\sigma_{ref.min}$, $\sigma_{ref.max}$] wherein $\sigma_{ref.min}$ is a minimum reference value and $\sigma_{ref.max}$ is a maximum reference value,
   c. sending said aqueous solution into (i) a demineralization filter if the physicochemical property $\sigma_m$ measured in step a) is outside said range of reference values [$\sigma_{ref.min}$, $\sigma_{ref.max}$], or into the engine if the physicochemical property $\sigma_m$ measured in step a) is inside said range of reference values [$\sigma_{ref.min}$, $\sigma_{ref.max}$],
   d. repeating steps a), b) and c) as long as the physicochemical property $\sigma_m$ measured in step a) is outside said range of reference values [$\sigma_{ref.min}$, $\sigma_{ref.max}$], and
   e. announcing with a signal S a problem if, after a predetermined period of time T, the measured physicochemical property $\sigma_m$ remains outside said range of reference values [$\sigma_{ref.min}$, $\sigma_{ref.max}$],
   wherein the process is controlled by an electronic control unit (ECU).

15. The diagnostic process according to claim 14, wherein the signal S of step e) is an indication to clean, recharge or replace the demineralization filter.

16. A process for injecting an aqueous solution into an injection engine, comprising:
   diagnosing the purity of the aqueous solution according to the diagnostic process of claim 14, and
   sending said aqueous solution into the injection engine if the physicochemical property $\sigma_m$ measured in step a) is within said range of reference values [$\sigma_{ref.min}$, $\sigma_{ref.max}$].

* * * * *